United States Patent [19]

Cooper

[11] 3,817,500

[45] June 18, 1974

[54] APPARATUS FOR RETARDING FREEZING OF A FLUID

[75] Inventor: Paul W. Cooper, Albuquerque, N. Mex.

[73] Assignee: Frank J. Castiglia, Colorado City, Colo.

[22] Filed: Jan. 4, 1972

[21] Appl. No.: 215,368

[52] U.S. Cl. .................................. 261/77, 138/42
[51] Int. Cl. ............................................. B01f 3/04
[58] Field of Search .......... 261/77, DIG. 75; 138/42

[56] References Cited
UNITED STATES PATENTS

| | | | |
|---|---|---|---|
| 1,941,613 | 1/1934 | McDonell | 73/392 |
| 2,744,065 | 5/1956 | Lacey | 261/77 |
| 3,452,966 | 7/1969 | Smolski | 261/77 |
| 3,628,775 | 12/1971 | McConnell | 261/77 |
| 3,671,022 | 6/1972 | Laird et al. | 261/DIG. 75 |

FOREIGN PATENTS OR APPLICATIONS

| | | | |
|---|---|---|---|
| 14,473 | 8/1912 | Great Britain | 261/77 |
| 409,528 | 5/1934 | Great Britain | 138/42 |

Primary Examiner—Tim R. Miles
Attorney, Agent, or Firm—Edwards, Spangler, Wymore & Klaas

[57] ABSTRACT

Apparatus for retarding freezing of a liquid including a tank of pressurized gas and a gas conducting line leading to a point beneath the surface of the liquid to generate and release bubbles into the liquid to create fluid circulation therein to retard freezing. The gas conducting line may include elongated, twisted wires coated with a tight-fitting gas sealing coat, the resistance to through-flowing gas presented thereby effecting a metering of the gas to release it at a predetermined rate below the surface of the liquid. Additionally, an escape chimney is also included which presents a vertically oriented gas conduit having holes at top and bottom with the gas bubbles being released therebetween to stimulate additional fluid circulation.

Disclosed also is apparatus defining a critical orifice for presenting a known resistance to gas or fluid flowing therethrough.

8 Claims, 1 Drawing Figure

PATENTED JUN 18 1974    3,817,500
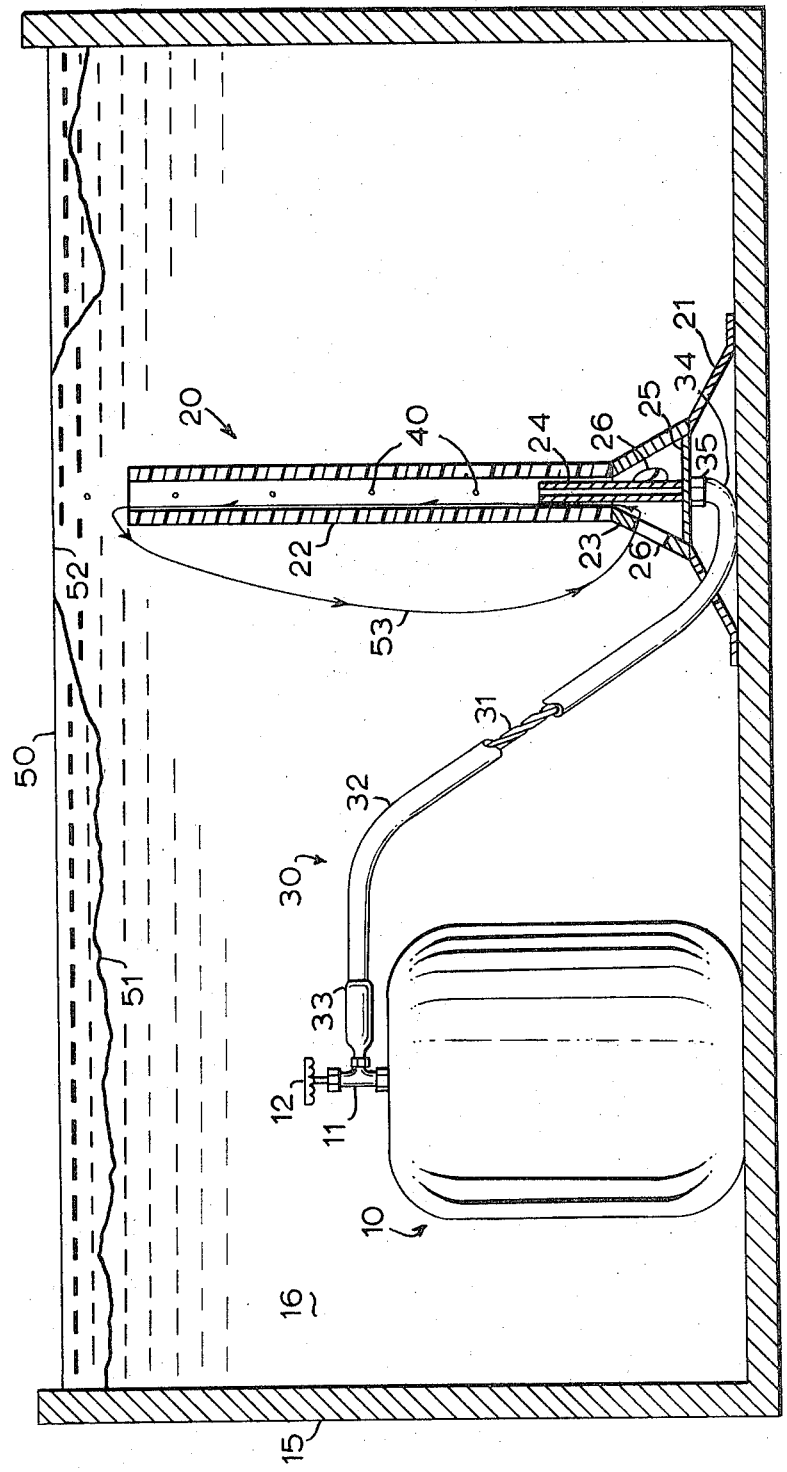

APPARATUS FOR RETARDING FREEZING OF A FLUID

BACKGROUND OF THE INVENTION

1. Field of the Invention

This invention relates to improvements in apparatus for retarding liquid freezing and more particularly to apparatus for retarding liquid freezing in which fluid circulation or vortices are created by released gas bubbles.

2. Description of the Prior Art

Often retarding or preventing freezing of a fluid is desirable or of importance. For example, stock water tanks for supplying water to cattle or stock out of doors must be kept from freezing lest the cattle become dehydrated. Consequently, much effort has been made to advance devices designed to promote a liquid state of the fluid or to prevent its freezing under extreme or low temperatures.

Of such devices presented, many, for example, provide heat, through a butane, oil or other type heater installed below the surface of the fluid. Generally such heaters are relatively expensive in initial investment, and, additionally, require continuous operation expense in providing a considerable supply of butane, oil, or other required energy source. Furthermore, since the apparatus necessarily employed in such fuel operated devices ordinarily contemplates fuel combustion, burning elements and fuel regulators of relatively complicated construction usually requiring careful, continuous maintenance are generally provided.

One problem encountered in overcoming the object of retarding freezing in a fluid in accordance with the method employing the apparatus of the invention, that of achieving an uncomplicated gas or fluid metering apparatus, is often encountered in other fields as well. For example, in fluid dynamics, calibrated critical orifices, the fluid dynamics equivalency to the electrical resistor, are used to present a resistance to a fluid or gas flow; however, very high fluid resistances corresponding to ultra-small orifices have been heretofore difficult, if not impossible to achieve. Since such critical orifices generally used are merely holes through a plate or the like, it can be seen that the smaller the desired orifice the more difficult it is to physically fabricate.

BRIEF DESCRIPTION OF THE INVENTION

In light of the above, it is, therefore, an object of the invention to provide apparatus for retarding the freezing of a fluid or liquid.

It is a further object of the invention to provide an apparatus for retarding freezing of a liquid by increasing the circulation within the liquid.

It is yet a further object of the invention to provide an apparatus for circulating a fluid by the release of gas bubbles beneath the surface of the liquid.

It is still a further object of the invention to provide apparatus for promoting circulation of a fluid to retard its freezing of uncomplicated, inexpensive structure which requires little, if any, maintenance.

It is yet another object of the invention to provide apparatus for achieving a critical orifice.

These and other objects, features, and advantages will become apparent to those skilled in the art from the following detailed description when read in conjunction with the accompanying drawing and appended claims.

In its broad aspect, the invention provides apparatus for retarding the freezing of a liquid, the apparatus including a plurality of elongated wire strands having an essentially gas-tight coat, tight fitting upon the length of the strands to thereby form a gas-conducting line beneath the surface of the liquid. When one end of the line is connected to a pressurized gas source, the wire strands act to resist the gas flow, thereby allowing a metered amount of gas to escape at the other end of the line to circulate the liquid and retard its freezing. To enhance the circulation of the liquid, a conduit or chimney is provided having open top and bottom portions between which the gas is released.

Additionally, the elongated wire strands covered with an essentially gas tight coat may be substituted for a critical orifice.

BRIEF DESCRIPTION OF THE DRAWING

The invention is shown in the sole accompanying drawing, a side plan view of the apparatus in accordance with the invention, partially cut away to show the interior construction of the gas conducting chimney.

It is understood that in the drawing various parts have been exaggerated in size or proportions for clarity and ease of description.

DETAILED DESCRIPTION OF THE INVENTION

As shown in the drawing, the invention includes within a chamber 15 filled with fluid 16 a tank 10, for supplying a gas (not shown) which may conveniently be LP gas, butane, propane, freon, or any other conveniently obtainable gas, a gas conducting chimney 20, and an interconnecting metering cable 30. The chimney 20 may be built upon a supporting base 21 having an upwardly extending vertically oriented tube or pipe 22, which may be connected to the base 21 by a member 23, of cone shape or the like. The parts of the chimney 20 may conveniently be of plastic, metal, polystyrene, polyvinyl chloride, or other material, but because the cone may be subjected for extended time periods to temperatures near freezing under water or other fluid, the particular materials chosen should be as durable as possible with these considerations.

Within the upstanding pipe 22, is a small pipe 24 of metal or other material, extending coaxially therewithin. The pipe 22 may be supported within the support cone 23 by a small metal platform 25. Arranged around the circumference of the cone 23 are a plurality of water inlet holes 26, to allow the fluid 16 to freely flow from within the chamber 15, to within tube 22, as below described in detail.

Interconnecting the tube 24 and the tank 10 is a gas conducting line 30. Because the gas from the tank 10 is contained under pressure, means are provided to control the pressurized gas to allow bubbles to escape from the pipe 24 within the chimney 20 at a metered or controlled rate. In accordance with the invention, it has been found that a wire or cable having a plurality of strands 31, twisted or braided along the length of the wire covered with an essentially gas-tight coating 32 along its length is an excellent gas transmission-metering means. It has been found, for example, that a 64 strand No. 36 wire having a rubber coat, sold under various trade names such as No. 18 test prod. leads, is entirely satisfactory for such metering purpose. The rate at which the bubbles are released within the fluid 16 is dependent upon the gas resistance characteristics of the particular wire chosen. Since braided wire generally available is not rated in terms of its gas resistance, (its use for gas metering not having been proposed heretofore) some experimentation will necessarily have to be done to achieve the desired gas release rate. It should be pointed out that the gas resistance is a function not only of the inherent gas flow resistance of the wire, over which a user has no control for a given wire, but of the length of the wire as well, over which the user does have control to achieve the precise desired gas flow rate. Thus, it has been found that with a No. 18 test prod. leads of length between 8 and 30 feet, that a flow rate of LP gas at 30° F. may be achieved of between 10 and 60 cubic centimeters per minute. To achieve any definite flow rate, perhaps of 20 cubic centermeters per minute at 30° F. will necessitate some minor experimentation, as above explained, since wire may vary from one type to another in the critical gas flow resistance parameter at such small flow rates.

Connection of the line 30 to the tank 10 may be made simply by abutting the cut wire 30 onto gas outlet 11 controlled by a handle or valve 12, or the like, with a gas tight fitting 33 such as a swaged or clamped fitting and the like in the manner well known in the art. Likewise, at the other end of the cable 30, connection may be made to the pipe 24 merely by an abutting connection at end 34, held in place, for example, by a fitting 35, or the like to provide a gas tight connection in a manner well known in the art.

In operation the chimney 20 is disposed beneath the surface of the water, the freezing of which is desired to be retarded. The gas within the tank 10 is applied to within the cable 30 by opening the valve 12, and the gas is transferred or conducted therewithin to the upstanding tube 24. From the tube 24 the small bubbles 40 of gas rise through the chimney 22 to the surface 50 of the fluid. The bubbles 40 carry through the chimney 22 the therewithin contained fluid to encourage currents of the fluid through holes 26 of the cone, up through the center of the tube 22, as shown by arrowed line 53.

Consequently, with the apparatus of the invention in operation as above described, the warmer water from below the surface 50 is circulated by the gas bubbles through the chimney to near the surface 50 thereby retarding the freezing of the fluid at the immediately above area 52 of the surface 50, although it may freeze at other areas 51.

Because the apparatus is intended for operation at temperatures near freezing, it has been found that by submerging the tank 10 below the surface 50 of the fluid that the contained gas expands more upon release since the temperatures within the fluid are above freezing whereas the temperatures above the surface 50 of the fluid are below freezing, resulting, therefore, in increased life of the gas before it is expanded.

Because of the unique use of the stranded or braided wire as a gas metering apparatus, it has been found that lengths of braided wire may be used as "critical orifices" in small sizes heretofore unachievable. Thus, for example, in creating a fluid resistance, the fluid dynamics equivalent of an electrical resistor, in the laboratory or the like, the gas may be applied to a stranded cable of known fluid resistance of given length to achieve a desired critical orifice. For instance, in using the wire above mentioned, No. 18 test prod. leads, it has been found that a critical orifice of 8 microns or less can be achieved, diameters heretofore unavailable without complicated and expensive equipment and apparatus.

Although the invention has been described and illustrated with a certain degree of particularity, it is understood that the present disclosure has been made by way of example only, and that numerous changes in the arrangement and combination of parts shown may be resorted to without departing from the spirit and scope of the invention as hereinafter claimed.

What is claimed is:

1. Apparatus for promoting circulation and retarding freezing within a liquid comprising:
   a source of gas under pressure;
   a plurality of elongated wire strands; and,
   an essentially gas tight coat tight fitting upon the length of said strands with one end thereof connected to said source to form a conducting line disposed beneath the surface of the liquid,
   whereby the gas flows within said wire strands and said coat which restricts the gas flow thereby allowing a metered amount of gas to escape at the other end beneath the surface of the liquid to circulate the liquid and retard freezing thereof.

2. Apparatus for retarding freezing of a fluid, comprising:
   supply means for supplying a gas, and
   metering means communicating with said supplying means for metering the gas to escape at a predetermined rate below a surface of the fluid, wherein said metering means comprises a plurality of elongated wire strands, and an essentially gas tight coat along the length of said strands.

3. The apparatus as claimed in claim 2 further comprising an escape chimney containing a portion of said metering means and within which said gas is allowed to escape, said escape chimney having at least one hole near a base thereof, whereby the fluid is circulated into at least one hole and through said chimney by the escaping gas.

4. The apparatus of claim 3 wherein said chimney is of plastic.

5. The apparatus of claim 3 wherein said chimney is of polyvinylchloride.

6. Apparatus for promoting circulation within a liquid, comprising:
   a plurality of elongated wire strands, and
   an essentially gas tight coat, tight fitting upon the length of said strands to form a gas conducting line beneath the surface of the liquid,
   whereby when one end of said line is connected to a pressurized gas source, and another end disposed within the liquid the gas flows within said wire strands and said coat which restricts the gas flow, thereby allowing a metered amount of gas to escape at said other end to circulate the liquid, and further comprising a vertical gas conduit below the surface of the liquid having at open top and bottom between which said other end of said gas conducting line is disposed, to encourage circulation therethrough and within the liquid.

7. The apparatus of claim 6 wherein said gas conduit is of plastic.

8. The apparatus of claim 6 wherein said gas conduit is of polyvinylchloride.

* * * * *